Figure 1:
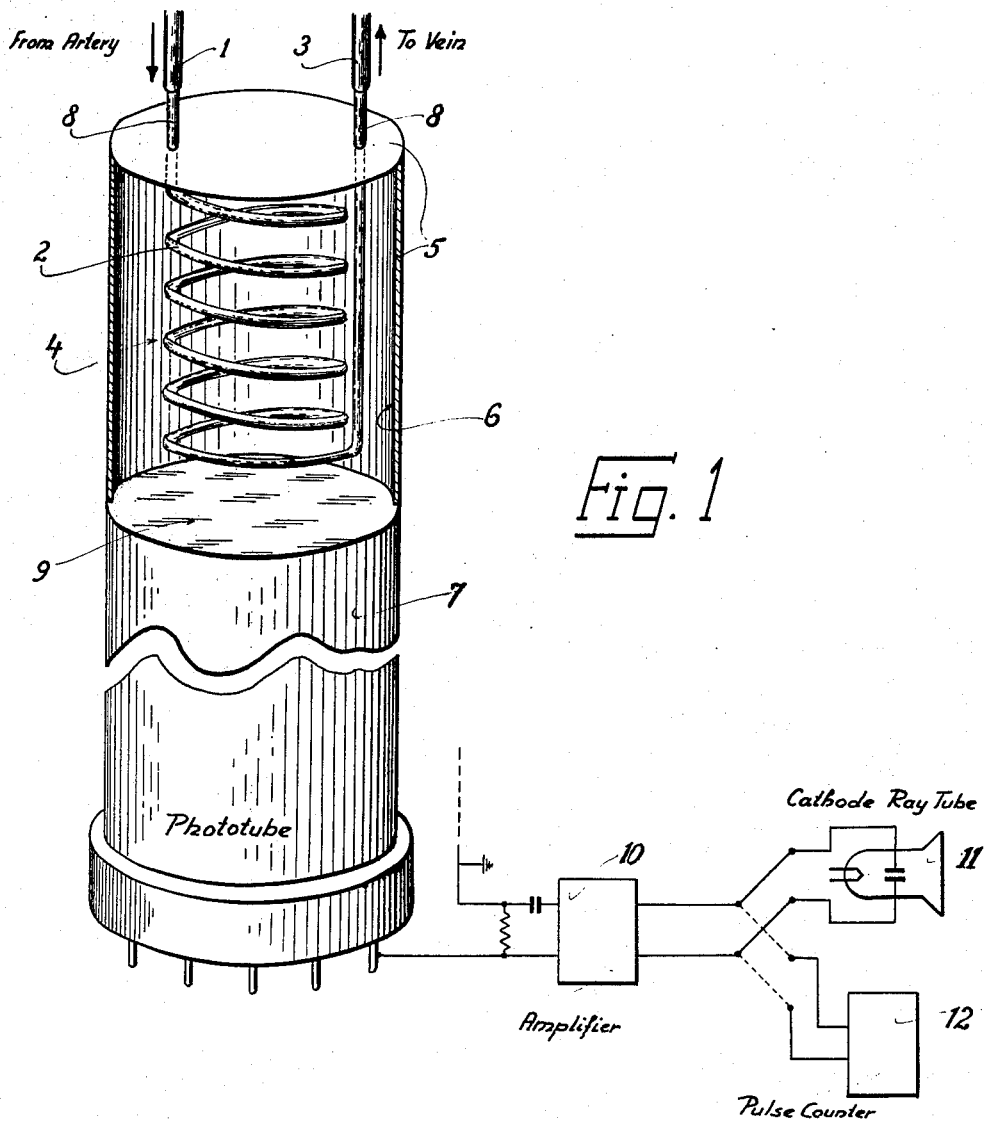

Nov. 22, 1960     I. W. RUDERMAN     2,961,541
MONITORING IONIZING RADIATION

Filed Aug. 13, 1952     2 Sheets-Sheet 1

INVENTOR:
IRVING W. RUDERMAN
BY
J. W. Schmied
ATTORNEY.

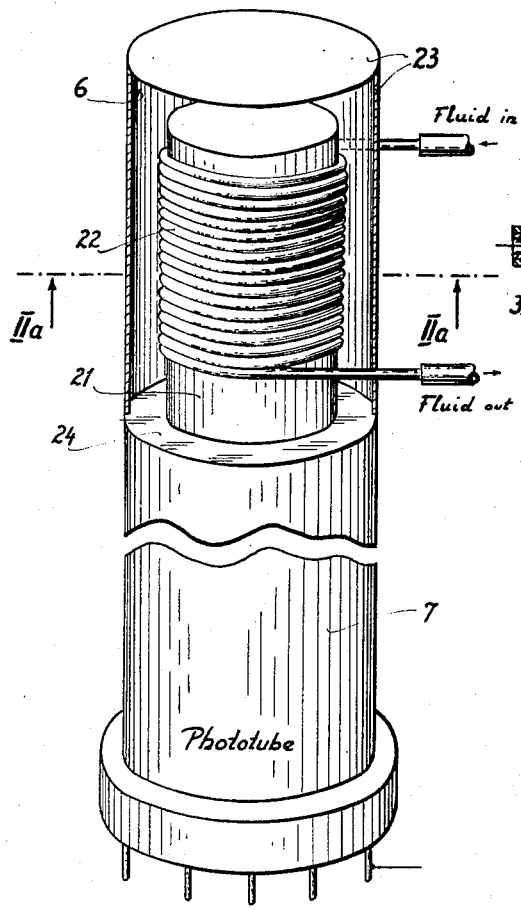
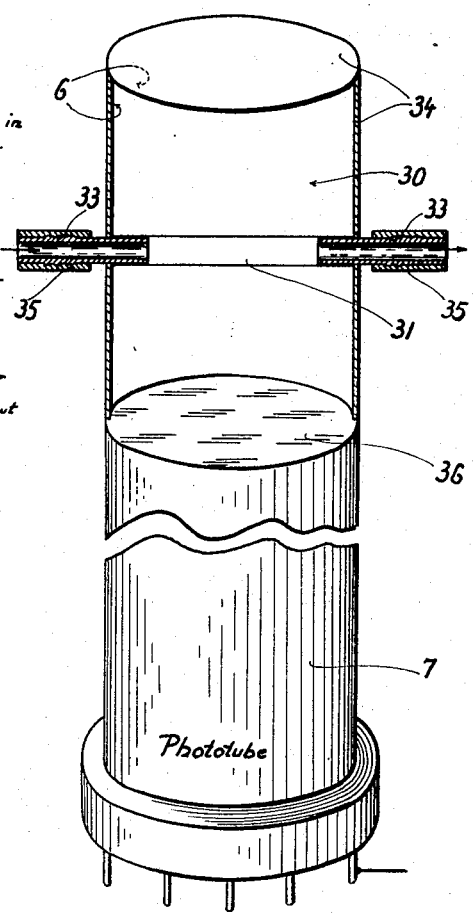
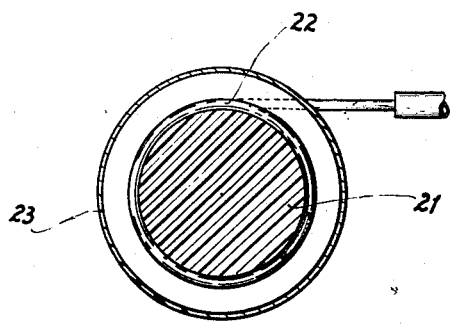

United States Patent Office 2,961,541
Patented Nov. 22, 1960

2,961,541

MONITORING IONIZING RADIATION

Irving W. Ruderman, Demarest, N.J., assignor to Isomet Corporation, Palisades Park, N.J., a corporation of New Jersey Filed Aug. 13, 1952, Ser. No. 304,119

19 Claims. (Cl. 250—71.5)

This invention relates to methods of and devices for continuously monitoring the radioactive component or tracer of a fluid.

Objects of the invention are to provide methods and means for monitoring upon and continuously, or intermittently at intervals of any desired closeness, recording or indicating the radioactivity of a flowing substance; to provide improved methods of and means for monitoring upon the radioactivity of a fluid stream; to provide means for and methods of monitoring upon the radioactivity of the blood stream of a living animal or person; and to provide improved structures, appliances, and combinations of parts for such and analogous purposes.

Although of wider applicability the use of methods and devices according to the invention may be and is disclosed herein in an exemplary manner for continuously measuring the radioactivity of the blood stream of a living animal, for example, a human subject.

For such purpose the general organization of means provided comprises a tube lying in juxtaposed relation to, as for example, wholly within a suitable body of material which is sensitive to ionizing radiation and fluoresces under the influence of such radiation, a casing surrounding the fluorescent body, reflecting means surrounding the casing so as to, as largely as possible, direct the resultant radiation lying in or near the visible spectrum produced therein preferably in a single direction to a single face, a radiation responsive device coupled thereto to produce electrical current or voltage impulses, waves, or flow incident to the radiation impressed thereupon through the coupling face; these impulses, waves, or current may be indicated, measured, or recorded in a known manner as by means of a cathode ray oscillograph, an impulse counter or by other means. Although essential to the useful application of features of the invention the novelty thereof does not reside per se in the indicating, measuring, recording or pulse registering or counting means or equipment. The fluorescent body may consist of a molded or formed block or a crystal of fluorescent substances. Different forms of structure may be used.

According to one embodiment a body of plastic fluorescent substance constituting a scintillating phosphor may be provided with one or more channels integrally cast therein through which the fluid or flowing substance under investigation may pass; according to a second embodiment a fluorescent crystal may be provided with a metallic, plastic or composition tube wrapped spiralwise around the crystal which is mounted for example in a suitable metal can, such as aluminum, which may be silvered or otherwise rendered reflective on its inner faces; or according to a third embodiment a fluorescent crystal may have a fluid flow path or paths machined therein.

Exemplary embodiments of apparatus incorporating the invention or wherewith it may be practiced are illustrated in the accompanying semi-diagrammatic drawings, wherein:

Fig. 1 illustrates a first embodiment;
Fig. 2 illustrates a second embodiment;
Fig. 2a is a cross-sectional view of Fig. 2 on the section line IIa—IIa of Fig. 2, and
Fig. 3, a third embodiment.

Fig. 1 illustrates diagrammatically means according to an exemplary embodiment of the invention for monitoring the radioactivity of blood of a living person or animal as, for example, for medical research or treatment.

A tube 1 leads from an artery (vein if desired) and is connected to receive blood therefrom through tube 1 by a needle or other connection to the blood vessel in any suitable manner known to members of the medical profession. The blood flows through a helical or other spiral passage 2 to an outlet tube 3, wherefrom it may be returned to a vein through a needle or other manner also according to medical practice. The passage 2 lies in a body 4 of plastic scintillating phosphor, a body giving off light under the influence of nuclear radiation, such as, "gamma" radiation or "beta" radiation. Compositions suitable for and the manner of constructing the phosphor in its casing 5 will be described hereinafter. The casing 5 may consist of metal such as aluminum and is silvered throughout on its inner surface with a silver plating 6 and may be of any one of several forms such as a flat cylinder, tall cylinder, or other suitable shape but is provided at one side or end with an opening optically tightly fittable or fitting to radiant energy or scintillation responsive device 7 such as the light input window of an electron multiplying tube identified more specifically hereinafter. The casing may be tightly fitted to the window cathode 9 of the tube 7 to exclude all extraneous light by sealing or similar means. The output terminals of the tube 7 are connected to a pulse or current amplifier or repeater 10, if needed, and its output may in turn be connected to deflecting electrodes of a cathode ray tube 11, by a two pole switch, or to a pulse counter circuit 12 of known type such as a binary or other counter, or to a photographic or other recorder. The circuitry and construction of the amplifier, cathode ray tube, pulse counter, their connections to each other, or to any other suitable recorder or indicator will follow known practices.

The body 4 may consist of such substances as styrene, methyl-methacrylate or other suitable substance of which a variety are known; a needed characteristic is that the material is capable of being polymerized or otherwise caused to assume the form of a transparent solid. In this solid there is dissolved or otherwise suitably distributed about 1/10 to 5% of one or more of a group of fluorescent materials, among which are: terphenyl; 1,1',4,4'-tetraphenyl butadiene-1,3; quaterphenyl; quinquephenyl; sexiphenyl; anthracene; transstilbene; 1,2-diphenyl acetylene; 1,4-diphenyl butadiene; and zinc sulphide activated with silver, i.e. ZnS with trace of AgS. Other substances suitable for the purpose are known. Their needed characteristics include high conversion of ionizing energy to light and transparency to their own radiation thus produced.

The tube 2 may be constructed by embedding a thin-walled aluminum, for example, spiral tube in the plastic phosphor. It is connected to the end tubes 8 which may be of different material not soluble in reagents which will dissolve aluminum and fixedly positioned in the casing.

The phosphor 4 may be made by the following exemplary process: To the monomer, such a styrene, is added 1% by weight of the phosphor employed and 0.5% by weight of a polymerizing catalyst such as benzoyl peroxide. The mixture is agitated until the phosphor and catalyst are completely dissolved. The solution is then transferred to a vessel, which may consist of the casing 5 inverted with the aluminum spiral already mounted therein, and the open bottom face, designed to later fit the window 9 of tube 7, which upon inversion becomes the top, temporarily covered with an air-tight lid. The vessel is transferred to an oven at about 40° C. After each twenty-four hours the temperature is raised 10° C. until it reached 80° C. at which time the temperature is held constant until polymerization is complete as evidenced by hardness of the product at room temperature. The time required may vary with the size of the mass.

After polymerization is complete the body of the spiral tube inserted to form the tubular passage 2 is dissolved out by any reagent suitable for the purpose, for example, dilute acid such as hydrochloric acid or dilute alkali such as sodium hydroxide, by passing the reagent through it until the desired dissolution of the tube has been achieved, this leaves a helical tubular opening. A desirable feature of the passage or opening 2 is that it have no pockets or corners to cause eddy currents in the fluid being examined. Subject to this requirement it may be of any suitable shape and size to give the required volume of fluid within the casing moving with a suitable velocity for the purpose in hand; a circular cross section is deemed most advantageous.

The electron multiplier photo-tube and associated circuits may be of any suitable type; a specific exemplary tube is one made and sold by the Radio Corporation of America and described, together with the mode of use and associated circuits and power supply required, in a publication entitled "5819 Multiplier Phototube," copyright 1949 by said corporation.

Further information on photo-multiplier tubes, scintillation counters and detection circuits therefor is given in a paper by Morton in the RCA Review, December 1949, vol. X, No. 4, page 525, and in the bibliography appended thereto; the techniques incident to the use of such equipment are known to those skilled in the art or are available in the above or other published sources of information, or both.

An essential requirement for the phosphor 4 is that it fluoresce under the influence of ionizing radio-activity and be transparent to its own radiation so that the emitted light will largely pass through the window 9 into the tube 7.

For the purposes of this specification light includes infra-red as well as ultra-violet and "spectral radiation" is used with the same significance.

In use, after the apparatus has been set up, a continuous monitor may be kept on the radioactivity of the blood during any desired tests, researches or for other purposes and the condition is registered, recorded, or read on the indicator instrument used for the purpose. Use is not limited to monitoring blood but may be used for examination or monitoring upon any body fluid or any other substance, fluid, solution, suspension or fluid-like substance which may be caused to flow through the opening 2. Because the volume of fluid under test is constant, uniformity of velocity of flow is not required. For tests on body fluids to be returned to a living body sterile procedures and any required temperature regulation of the apparatus to which the fluid is exposed are presumed. For many other purposes such as monitoring waste or other substances incident to industrial operations such precautions are unnecessary. Suitable variations of size and shape of the equipment for such and other analogous and equivalent although different purposes will be obvious to one skilled in the art.

A modified arrangement is shown in Fig. 2, in which a scintillating phosphor crystal is employed as the element for converting any kind of radiation of great penetrating power, such as high energy "beta" radiation or "gamma" radiation to light. A fluorescent or scintillating crystal 21 is surrounded by a hollow tubing 22 of plastic material, thin aluminum or stainless steel with closely adjacent turns forming a tight spiral. The crystal may consist of a plastic phosphor of known type such as anthracene; stilbene; di-phenyl acetylene; p-terphenyl; calcium tungstate; or cadmium tungstate, as examples of a non-hygroscopic group; or activated sodium, lithium, or potassium iodide as examples of a hygroscopic group. The input hose 1 and connection 8 for the fluid and its output hose 3 and connection 8 are similar to the corresponding parts of Fig. 1. The crystal 21 and surrounding tube 22 are mounted in a can 23 composed, for example, of aluminum. In the case of hygroscopic crystals glass window 24 has the crystal cemented by plastic cement to the bottom, or outer, face of the crystal, and the outer rim of the window 24 may be similarly cemented to the can 23. The sealing should be carried out in a dry atmosphere such as a "dry-box" to prevent deterioration of the crystal and to insure that the air left within the can is substantially devoid of moisture. In either case the face of the glass cover or the face of the crystal is fitted to the light window of an electron photo-multiplier tube 7 in a manner to transmit light to the tube effectively but to exclude extraneous light from the tube. Tube output circuits and equipment will be provided as in Fig. 1 and the manner of use and mode of operation are as stated in connection with the use of the arrangement of Fig. 1.

According to Fig. 3 a fluorescent crystal 30 of any suitable composition such as mentioned above has a fluid flow path 31 bored or drilled therein in any desired direction and nipples 33 are passed through the walls of a sealing can 34 with interior silver plating and caused to have a tight fit with the opening in the crystal by friction or by threads upon the inner ends of the nipples. After attachment to the crystal the nipples may be soldered tightly to the case and connected to hoses or tubes 35. If desired there may be several parallel paths 31 connected by branch hoses to the input and output hoses 35. The can 34 is closed at one end—the top—and provided at the bottom with an opening which is of a size and contour to fit the window opening of the electron photo-multiplier tube to be employed. An intervening glass sealing cover may or may not be employed as necessary or desired.

In devices of the kinds described the glass window opening of the casing or can 5 may be coupled for light transmission to the window opening of the photoelectric tube by a highly transparent liquid such as a high viscosity silicone.

For maximum effect of the available ionizing radiation an embodiment such as Fig. 1 in which the radiation given off from the monitored fluid in any direction and in Fig 3 in almost any direction strikes the fluorescent body is advantageous. That is, the solid angle for interception of radiation by the fluorescent material is $4\pi$ or nearly so. Also advantageous is the lack of any absorbing surface between the fluid and the phosphor. These features are particularly advantageous when the radioactive tracer or substance in the fluid gives off low energy radiation, i.e., the energy radiation is low such as below 100 k.e.v.

Obvious possibilities of variations in detail exist, hence the intent is to include within the scope of the appended claims such variants of structure, detail, and usage as would occur to those skilled in the art in utilizing the principles of the invention.

What is claimed is:

1. The method of monitoring upon the ionizing radiation of a stream of fluid which comprises causing the radiation emanating from the fluid in a solid angle approximately $4\pi$ to cause light radiation, directing the light radiation within a small solid angle, causing the light radiation thus directed to produce electrical effects varying with the radiation, and observing the electrical effects monitorwise.

2. The method of monitoring upon the ionizing radiation of a stream of fluid which includes causing the radiation emanating from the fluid in a solid angle approximately $4\pi$ to create spectral radiation, collecting the spectral radiation in a solid angle approximately $4\pi$, and directing the collected spectral radiation into a limited solid angle which is a small fraction of $4\pi$ for observation.

3. The method of observing the ionizing radiation of a quantity of material which consists in creating spectral radiation by substantially the entirety of the ionizing radiation proceeding out of the said material in a solid angle approximately $4\pi$, creating an effect by substantially the entirety of the spectral radiation, and observing the effect.

4. A solid body consisting essentially entirely of fluorescent phosphor of macroscopic dimensions having a passage therethrough of long dimension greater than the longest dimension of the phosphor in combination with inlet and outlet means for an ionizingly radiating substance to flow through the passage, in combination with means for supplying said substance.

5. A combination according to claim 4, wherein the body is surrounded over the greater part of a solid angle of $4\pi$ with a material presenting a continuous surface of high reflecting power to the body, and a photo-sensitive means substantially surrounding the remainder of the solid angle of $4\pi$.

6. A macroscopic crystalline phosphor surrounded by a spirally applied tube permeable to ionizing radiation, means for supplying material to be examined for ionizing radiation to the interior of the tube, material presenting a reflective surface in a major part of a solid angle of $4\pi$ surrounding the phosphor and the tube, and a photo-sensitive element of an indicating means presented to the phosphor over a major portion of the remainder of said solid angle.

7. In combination, a closed vessel consisting of material highly reflective upon at least the major part of its inner surface, material sealed within said vessel having the characteristic property of fluorescence to produce spectral radiation when exposed to ionizing radiation, means for introducing material to be examined for ionizing radiation into and removing it from the volume of space bounded by the walls of said vessel without opening said vessel, said vessel having walls suitable for preventing stray ionizing radiation from passing into said vessel through said walls, an opening in said vessel, and a photo-sensitive cathode of a space discharge device sealed to said opening by means to permit spectral radiation to pass through said opening and to impinge upon said cathode but to exclude stray spectral radiation from impinging upon said cathode.

8. In an apparatus for measuring or monitoring the radioactivity of fluid, the combination of a fluid flow channel with input and output connections for the fluid, a scintillating phosphor crystal body in intimate physical relationship with said fluid flow channel for receiving incident radiation and converting it to wave energy in or near the visible spectrum including infra-red and ultra-violet, shielding means generally surrounding the phosphor and a significant portion of the channel to be monitored whereby extraneous radiation is excluded, said shielding means being provided with a highly reflective inner surface, an opening in said shielding means forming a window for the said wave energy in or near the visible spectrum, a response device of the wave-energy-input-electric-voltage-output type for the produced wave energy, and a coupling between the window and said device.

9. In apparatus for measuring or monitoring the radioactivity of fluid, a shielding means for the exclusion of extraneous radiation surrounding and defining an enclosed space, a fluid flow channel within said space, input and output connections for supplying fluid to be monitored to said channel, a macroscopic body of fluorescent scintillating material within said space in intimate physical juxtaposition to said channel whereby scintillation creating energy may pass readily from said fluid into said scintillating material to cause the emission therefrom of wave energy in or near the visible range, a window transparent to said wave energy in said shielding means which window completes the enclosure of said space and a device responsive to said wave energy for creating electrical current impulses, said device having an element sensitive to said wave energy coupled to said window for transmission of said wave energy.

10. In a combination according to claim 9, a surface highly reflecting for said wave energy covering the internal surface of said shielding means for increasing the wave energy reflected toward said window.

11. A combination according to claim 9, wherein the fluid flow channel lies physically within the body of fluorescent scintillating material whereby the scintillation causing energy from the fluid to be monitored emitted therefrom in any direction over substantially the whole of a solid angle of 4 pi strikes or traverses the body.

12. Arrangement according to claim 9, wherein the fluid flow channel lies within and has its walls formed by said body.

13. Arrangement according to claim 9, wherein the fluid flow channel is curved about within the scintillating phosphor body to increase the surface area of the walls of the channel within the body.

14. Arrangement according to claim 9, wherein the fluorescent scintillating body is a single fluorescent crystal.

15. Arrangement according to claim 9, wherein the scintillating body is composed of a fluorescing substance subject to deterioration by exposure to moisture and the said shielding means and window form a hermetically sealed vessel of reduced moisture content.

16. Arrangement according to claim 9, wherein the scintillating body occupies from a major part to substantially the whole of the space defined by said shielding means and window.

17. Arrangement according to claim 9, wherein the device responsive to said wave energy is coupled to an indicator giving a substantially consecutive indication with time of the scintillation causing energy emanating from the said fluid.

18. Arrangement according to claim 9, wherein the light path from the scintillating body through the window has its light transmission properties improved by the coupling of the body to the window by a liquid having a high refractive index such as possessed by a high viscosity transparent silicone.

19. A fluorescent solid body composed of polymerized hydrocarbon having minutely dispersed therein material scintillating upon activation by nuclear radiation said body being transparent to the spectral light produced incident to the scintillation, said body having an internally spiraled passage extending through it with openings from each end of the passage terminating at the exterior surface of the body.

References Cited in the file of this patent

UNITED STATES PATENTS

| | | |
|---|---|---|
| 2,281,579 | Henninger et al. | May 5, 1942 |
| 2,308,516 | Knott | Jan. 19, 1943 |
| 2,340,967 | Langer | Feb. 8, 1944 |
| 2,357,238 | Trimble | Aug. 29, 1944 |
| 2,501,376 | Breadner et al. | Mar. 21, 1950 |
| 2,550,107 | Coltman | Apr. 24, 1951 |
| 2,551,650 | Urbach | May 8, 1951 |
| 2,694,152 | Teichmann | Nov. 9, 1954 |
| 2,706,254 | Mithoff et al. | Apr. 12, 1955 |
| 2,738,426 | Hurst | Mar. 13, 1956 |
| 2,739,242 | Armistead | Mar. 20, 1956 |

OTHER REFERENCES

"Ray Tracer of Atomic Fission," Burger, Scientific American, February 1947, pages 53 to 56 and 79.

"Radioactive Isotopes as Tracers," Kramer, Power Plant Engineering, November 1947, page 108.

"Instrumentation for Radioactivity," Pieper, Science, vol. 112, October 6, 1950, pages 377 to 381.